United States Patent [19]

Deasy et al.

[11] Patent Number: 4,793,021
[45] Date of Patent: Dec. 27, 1988

[54] MOLDED CASTER PINTLE WITH HIGH STRENGTH CORE

[75] Inventors: Richard Deasy, Torrance; Henry J. Folson, Redondo Beach, both of Calif.

[73] Assignee: Illinois Tool Works, Inc., Chicago, Ill.

[21] Appl. No.: 661,847

[22] Filed: Oct. 17, 1984

[51] Int. Cl.[4] .................... B60B 33/00; E05D 5/10
[52] U.S. Cl. ................................ 16/37; 16/38; 16/273; 16/386
[58] Field of Search ............... 16/37, 38, 39, 42 T, 16/43, 44, 381, 386, 380, 385, 228, 273, DIG. 13

[56] References Cited

U.S. PATENT DOCUMENTS

| | | | |
|---|---|---|---|
| 1,721,301 | 7/1929 | Herold | 16/38 |
| 1,929,743 | 10/1933 | Jarvis et al. | 16/38 X |
| 2,828,668 | 4/1958 | DeAngelis | 16/228 X |
| 3,128,495 | 4/1964 | Tooth | 16/43 |
| 4,120,071 | 10/1978 | Crescenzi | 16/37 |
| 4,256,388 | 3/1981 | Beyer | 16/385 X |

FOREIGN PATENT DOCUMENTS

| | | | |
|---|---|---|---|
| 2131921 | 1/1972 | Fed. Rep. of Germany | 16/273 |
| 40114 | 7/1968 | Finland | 16/38 |
| 636020 | 3/1928 | France | 16/38 |
| 90798 | 1/1968 | France | 16/273 |

*Primary Examiner*—Fred A. Silverberg
*Attorney, Agent, or Firm*—John P. O'Brien; Thomas W. Buckman

[57] ABSTRACT

A caster pintle as disclosed having a resilient high tensile strength metal core encapsulated in a molded plastic body having a groove containing a resiliently collapsible friction ring and means for centering the ring in the groove prior to assembly of the pintle with a complementary socket.

8 Claims, 2 Drawing Sheets

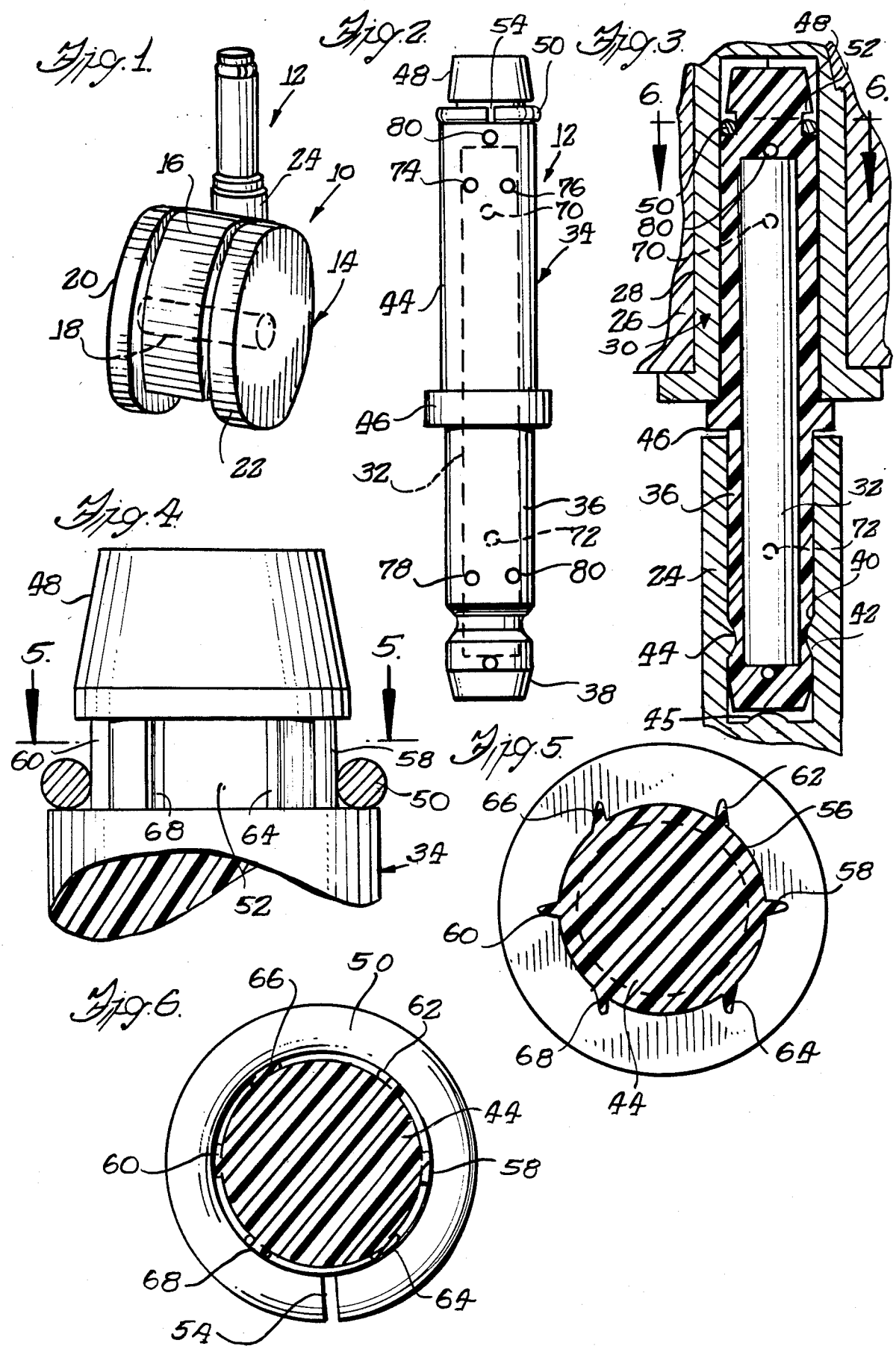

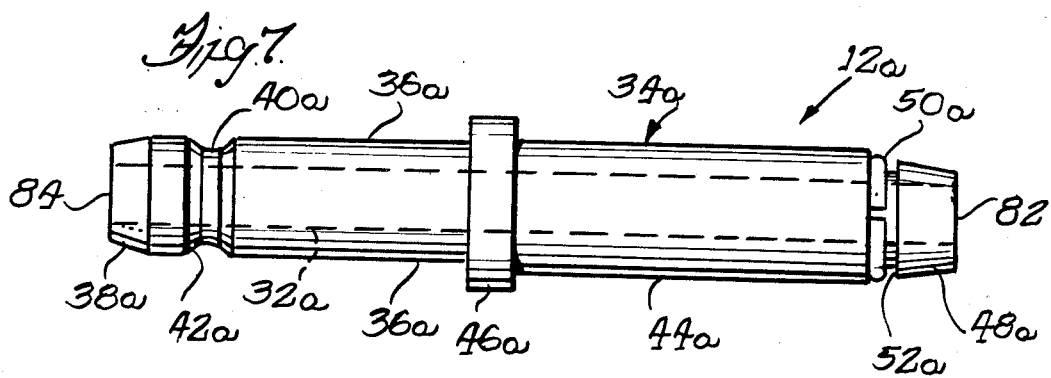
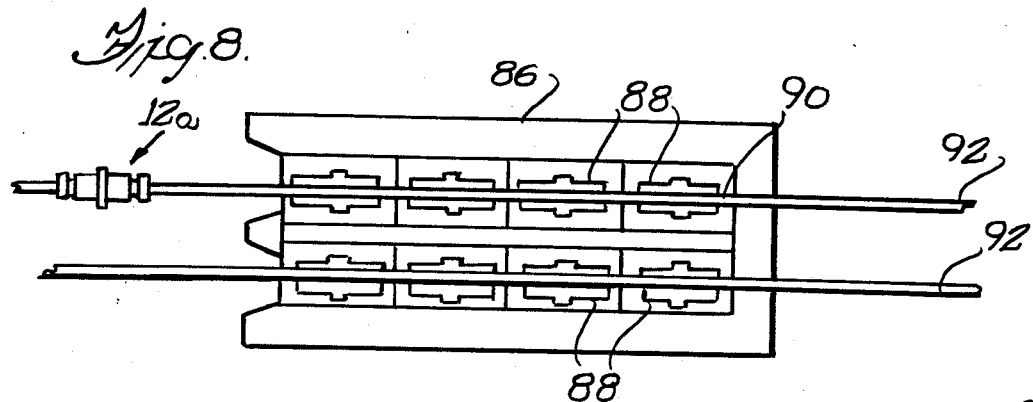
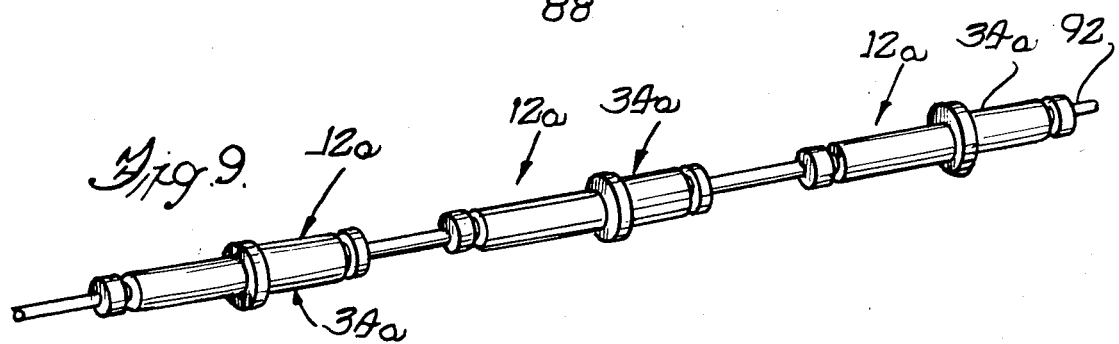
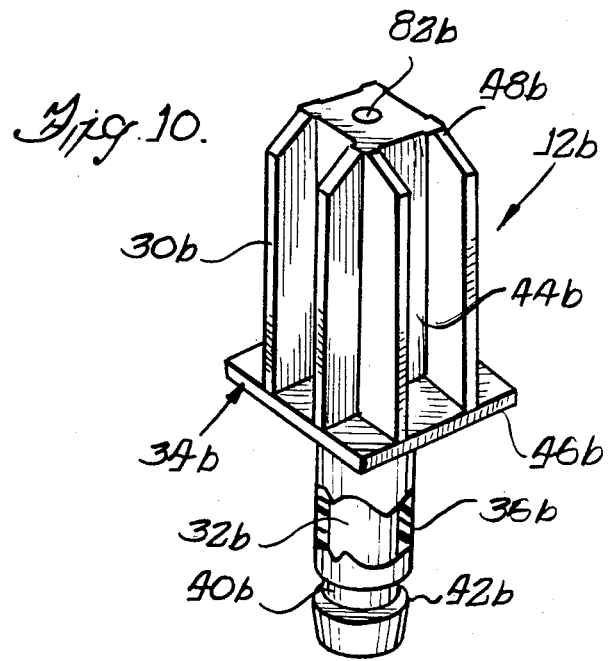

MOLDED CASTER PINTLE WITH HIGH STRENGTH CORE

OBJECTS AND SUMMARY OF THE INVENTION

The present invention relates to a novel pintel construction, and more particularly to a novel pintel especially suitable for supporting caster wheels.

One type of caster heretofore in general use for furniture, carts and similar applications has included a wheel and axle assembly, a forged metal pintle or stem pivotally or swively connected to the wheel assembly and insertable into a socket fixed to the furniture or other structure with which the caster is to be assembled. Such heretofore suggested casters have also included a resiliently deformable ring loosely fitting in a groove in the pintle or stem and adapted frictionally to engage the interior wall of the socket for retaining the caster in assembled relationship with the socket.

While such caster structures have been widely used, certain problems have been encountered from time to time. For example, the metal, usually steel, from which the pintle is forged, must be sufficiently soft to permit the forging operation. As a result, such pintles may be subject to damage or bending resulting from shocks or momentary overloads to which the furniture or other article may be subjected during use. Furthermore, with such heretofore suggested structures, the resiliently deformable friction ring may slip out of proper alignment prior to assembly with the socket so that such assembly is made difficult or impossible.

It is an important object of the present invention to provide a novel caster pintle capable of overcoming the aforementioned difficulties.

A more specific object of the present invention is to provide a novel caster pintle which is sufficiently strong and resilient to avoid damage from shocks or momentary overloads and which at the same time may be easily and economically configured for cooperative interengagement with a caster wheel assembly and a complementary socket.

Still another object of the present invention is to provide a novel caster pintle of the above-described type which includes means for maintaining a deformable friction ring properly centered with respect to this pintle while permitting the friction ring to be collapsed or deformed for facilitating assembly in a complementary socket.

A still further specific object of the present invention is to provide a novel composite caster pintle comprising a core of high tensile strength resilient metal such as steel and a body of molded plastic material around the core and providing the pintle with a configuration for cooperative interengagement with a wheel assembly and socket.

BRIEF DESCRIPTION OF THE DRAWINGS

Other objects and advantages of the present invention will become apparent from the following description and the accompanying drawings wherein:

FIG. 1 is a perspective view showing a pintle incorporating features of the present invention connected with a caster wheel assembly;

FIG. 2 is an enlarged side elevational view showing a caster pintle incorporating features of the present invention;

FIG. 3 is a fragmentary partial sectional view showing the pintle of FIG. 2 associated with a caster wheel assembly and also inserted into a complementary socket mounted in a piece of furniture or other structure;

FIG. 4 is an enlarged fragmentary side elevational view of the pintle of FIG. 2 showing a portion of the structure in greater detail;

FIG. 5 is a sectional view taken along line 5—5 in FIG. 4 with the split friction ring omitted;

FIG. 6 is an enlarged partial sectional view taken along line 6—6 in FIG. 3;

FIG. 7 is a side elevational view showing a modified form of the pintle of the present invention;

FIG. 8 is a somewhat schematic view showing means for molding the plastic bodies along core wires of pintles of the type shown in FIG. 7;

FIG. 9 is a fragmentary perspective view showing a series of pintles molded with the means shown in FIG. 8; and FIG. 10 is a perspective view partially broken away showing a further modified form of the present invention.

DETAILED DESCRIPTION OF A PREFERRED EMBODIMENT

Referring now more specifically to the drawings wherein like parts are designated by the same numerals throughout the drawings, a caster 10 is shown in FIG. 1 which includes a pintle 12 incorporating features of the present invention connected with a wheel and axle assembly 14 of known construction. As indicated, the wheel and axle assembly may be of any known construction and therefore need not be described in detail. It suffices to state that the unit shown herein comprises a body member 16 carrying an axle 18 which supports wheels 20 and 22. The body 16 includes a socket portion 24 for receiving one end of the pintle as will be described more in detail below. It will be understood that casters incorporating pintles of the present invention may be assembled with a wide variety of furniture pieces, carts or other structures. Such structures usually include a frame member designated 26 for purposes of illustration in FIG. 3 having an aperture 28 in which a socket 30 is secured for receiving an upper end of the pintle. It should be noted that the pintle 12 may be inserted directly into a properly sized hole drilled directly in the structure itself.

As shown best in FIGS. 2 and 3, a pintle 12 incorporating the present invention comprises a core element 32 formed from a high tensile strength resilient or spring metal such as steel as distinguished from a relatively soft malleable material such as low carbon cold heading quality steel. This core gives the pintle relatively great strength and resilience and the ability to withstand impact loads and the like which would be likely to result in bending or other permanent damage to heretofore suggested caster pintles. It will be noted that the core 32 is of extremely simple cylindrical configuration and may be easily and economically produced simply by cutting a length from a piece of wire stock material.

The pintle 12 also includes a body 34 of tough resilient organic plastic material molded around and, in this embodiment, completely encapsulating the core 32. The body 34 is formed with an exterior configuration complementary to the socket portion 34 of the wheel assembly and the socket 30, which configuration can be easily and economically produced by a molding operation rather than a forging or cold-framing operation previsously required for metal pintles.

As shown in FIGS. 2 and 3, the plastic body 34 is provided with a first or lower end portion 36 having a diameter similar to the internal diameter of the wheel and axle assembly socket 24. This end portion 36 terminates in a tapered bevelled section 38 for facilitating insertion into the socket 24. A groove 40 is formed in the end portion 36 adjacent to the tapered section 38 for providing a radial shoulder 42 interengageable with complementary rib 44 formed on the interior of the socket 24 for retaining the parts in assembled relationship. It will be noted that the plastic material of the body 34 is sufficiently resiliently deformable to permit the shoulder 42 to be snapped beneath the rib 44 during insertion of the pintle into the socket 24. While the pintle fits within the socket 24 relatively closely, there is sufficient clearance to permit the wheel assembly to pivot or swivel freely relative to the pintle. Furthermore, the plastic material of the body 34 provides an anti-friction bearing surface and may even have a lubricant embedded therein for promoting free swivel movement between the wheel caster and the pintle. Bottom of socket 24 has dome shaped bearing pad 45 to support the pintle and allow free swivel of the socket 24 about the pintle 12.

The plastic body 34 is formed with an upper or second end portion 44 complementary to and adapted to be inserted in the socket 30. An annular shoulder 46 is provided on the plastic body 34 between the end portions 36 and 44. This shoulder 46 is adapted to engage the underside of the socket 30 so as to provide a thrust bearing therebetween.

Thrust is carried through the pintle 12 to the raised bearing pad 45 in socket 24. The upper end portion 44 of the pintle has a diameter closely similar to the internal diameter of the socket 30 so as to fit snugly therein. A tapered section 48 is formed at the upper terminal of the end portion 44 for facilitating entry into the socket during assembly.

In order to enhance frictional interengagement between the pintle and the socket 30, a resiliently deformable friction ring 50 is assembled in a groove 52 formed in the end portion 44 immediately adjacent the tapered section 48. The ring 50 is formed from a suitable spring material such as spring steel and preferably is split as indicated at 54 in FIGS. 2 and 6 so as to facilitate collapsing. The ring 50 initially has a diameter greater than the diameter of the end portion 44 and greater than the internal diameter of the socket 30 so that it will have an interference friction fit with the socket 30 when the parts are finally assembled. It will be noted that the maximum diameter of the tapered section 48 of the end portion is less than the diameter of the remainder of the end portion 44 so that the split ring may be relatively easily pushed over the end section 48 and snapped into the groove 52.

The groove 52 has a bottom or cylindrical surface 56 having a diameter substantially less than the internal diametet of the ring 50 when the ring is in its normal or undeformed condition. The smaller diameter of the surface 56 is such as to permit the ring to be collapsed for insertion into the bore of the socket 30. In accordance with a further feature of the present invention, means is provided in the groove 52 for maintaining the ring 50 substantially centered with respect to the longitudinal axis of the pintle while still permitting the ring to be collapsed during assembly with the socket 30. This centering means prevents the ring from sliding to one side in the groove to such an extent that it would interfere with the entry of the pintle into the socket 30 thus making assembly difficult or impossible. In the embodiment shown, this centering means comprises a first pair of diametrically opposite thin ribs 58 and 60 extending radially from the wall 56 and second and third pairs of oppositely extending ribs 62, 64 and 66, 68 respectively projecting on extensions of chords of a circle defined by the bottom 56. These ribs are generally equally spaced around the bottom surface 56 and have their outer ends disposed on an imaginary circle having a diameter similar to the internal diameter of the ring 50. Thus, the ribs serve to center the ring with respect to the pintle.

The ribs 58 through 68 are relatively thin and are resiliently deformable. Thus when the pintle is inserted into the socket 30, the split ring 50 is deformed or squeezed inwardly, which action is permitted by the resilient deflection or deformation of the ribs 58 through 68 as shown best in FIG. 6. It will be noted that the diametrically oppositely extending ribs 58 and 60 will be substantially crushed by the ring while the ribs 62 through 68 will be folded over as well as crushed so that the ribs provide a resilient spring action enhancing the inherent spring action of the ring 50 for causing the ring aggressively to engage the interior surface of the socket 30.

As previously indicated, the body 34 is molded so as to completely encapsulate the core 32. This is accomplished by supporting core 32 centerly in a mold cavity, not shown, by means of a plurality of locating pins also not shown so that when the plastic material is injected into the mold cavity, it will flow completely around the core. When the mold is opened and the locating pins are removed, the plastic body 34 is left with a plurality of holes. As indicated in FIGS. 2 and 3, holes 70 and 72 are formed by locating pins at one side of the mold and toward opposite ends of the cavity. Complementary pairs of pins at opposite side of the mold form apertures or holes 74, 76 and 78, 80. The three point arrangement of these holes and thus the locating pins is such that the core is securely held in the mold cavity. An additional locating pin is provided adjacent one end of the cavity for engaging one end of the core element and thus locating it in the cavity and this pin provides hole 80 shown in FIGS. 2 and 3.

In FIGS. 7, 8 and 9, there is shown a modified form of the present invention which is similar to the structure described above as indicated by the application of identical reference numerals with the suffix a added to corresponding elements. In this embodiment, the core element 32a extends entirely through the plastic body 34a and thus is encapsulated except for exposed opposite ends 82 and 84. The pintle of this embodiment is adapted to be formed in the manner shown in FIGS. 8 and 9. More specifically, complementary mold halves 86, only one of which is shown, are provided. These molds are formed with a plurality of cavities 88 and longitudinally extending bores 90 adapted to receive a length of continuous wire or core stock material 92 extending through a row of aligned cavities. When the molding operation is completed, a series of pintles 12a on a continuous wire 92 is provided as shown in FIG. 9. This arrangement facilitates locating the core material in the mold cavities and further handling of the pintles. As a further step in the manufacturing operation, the sections of the wire 92 between the plastic bodies 34a are severed by means not shown to produce the pintle and the form shown in FIG. 7.

FIG. 10 shows a further modified form of the present invention in which elements corresponding to those described above are designated by the same reference numerals with the suffix b added. In this embodiment, the socket 30b adapted to be fitted into a complementary aperture in a piece of furniture or the like is molded integral with the end portion 44b of the body member 34b. This embodiment may be provided with a core member 32b which extends entirely through the plastic body as shown or which is entirely encapsulated in the manner of the embodiment of FIGS. 1–6.

While preferred embodiments of the present invention have been shown and describe herein, it is obvious that many structural details may be changed without departing from the spirit and scope of the appended claims.

The invention is claimed as follows:

1. A caster pintle comprising an elongated high tensile strength resilient metal core, and a molded tough resilient organic plastic body molded around and substantially encapsulating said core, said body having a first end portion with means formed thereon for pivotally engaging a caster wheel means and a second opposite end portion with means for engaging a complementary mounting opening.

2. A caster pintle, as defined in claim 1, which includes shoulder means on said first end portion for interengagement with a complementary shoulder on said caster wheel means for resisting axial separating of the wheel means from the pintle, said body including an annular shoulder between said first and second end portions.

3. A caster pintle, as defined in claim 1, wherein said second end portion has a predetermined outside diameter and an annular recess having a diameter less than said outside diameter, a resiliently deformable friction ring disposed in said recess for frictionally engaging an inner wall of said mounting opening and resisting axial removal of the pintle from said mounting opening, said friction ring having a normal outside diameter greater than the diameter of said recess, and means in said recess for initally centering said friction ring with respect to the pintle body while permitting the friction ring to be collapsed upon insertion into said mounting opening.

4. A caster pintle as defined in claim 3, wherein said means for centering are integrally molded in said body.

5. A caster pintle as defined in claim 3 wherein said means for centering are a plurality of deformable axially oriented fins.

6. A caster pintle, as defined in claim 5, wherein said plurality of ribs comprises at least one radially extending rib adapted to be crushed upon inward deformation of said ring and at least one rib extending on a projection of a chord of said body and adapted to be folded upon inward deformation of said ring.

7. A caster pintle comprising an elongated high tensile strength resilient steel core, and a molded tough resilient organic plastic body molded around said core, said body having a first end portion for pivotal interengagement with caster wheel means and a second opposite end portion for insertion into a complementary mounting opening, said second end portion having a predetermined outside diameter and an annular recess having a diameter less than said outside diameter, a resiliently deformable friction ring disposed in said recess for frictionally engaging an inner wall of said mounting opening and resisting axial removal of the pintle from said mounting opening, said friction ring having a normal outside diameter greater than the diameter of said recess, and means integrally molded in said recess for initially centering said friction ring with respect to the pintle body while permitting the friction ring to be collapsed upon insertion into said mounting opening, said means for centering said ring comprising a plurality of deformable ribs integral with said plastic body.

8. A caster pintle comprising an elongated high tensile strength hardened metal core, and a tough resilient plastic molded body formed around and substantially encapsulating said core, said body having at least one end with a groove for receiving a friction ring, said groove having means integrally molded therein for maintaining said ring in a position generally concentric with a longitudinal axis of said body, said means including axially oriented deformable ribs generally equally spaced about said axis.

* * * * *